United States Patent Office 3,410,801
Patented Nov. 12, 1968

3,410,801
FRICTION-MODIFIED CLUTCH FLUIDS
Norman Tunkel, Perth Amboy, Gerald D. Staffin, Westfield, and George A. Mead II, Scotch Plains, N.J., assignors to Esso Research and Engineering Company, a corporation of Delaware
No Drawing. Filed Aug. 31, 1965, Ser. No. 484,113
7 Claims. (Cl. 252—74)

ABSTRACT OF THE DISCLOSURE

The product of obtained by reacting an overbased polyvalent metal sulfonate, particularly an alkaline earth metal sulfonate, having a total base number of from about 50 to about 350, with from 10 to 150 weight percent of a $C_{12}$ to $C_{22}$ fatty acid, such as oleic acid, based on the weight of sulfonate, is an effective additive for modifying the friction characteristics of a hydrocarbon lubricating oil when it is used as a hydraulic fluid, particularly for wet clutch lubrication in the transmissions of automobiles, tractors, etc. The reaction product is added to the lubricating oil in an amount within the range of about 0.2 to 5 weight percent.

---

This invention concerns improved friction modifiers for hydraulic fluids such as transmission fluids, lubricants for wet clutches, and the like. The invention also concerns improved hydraulic fluids containing such improved friction modifiers. In particular, these friction modifiers comprise reaction products of fatty acids and overbased polyvalent metal sulfonates.

In the operation of automatic transmissions such as those that are now used in a high percentage of automotive vehicles, many of the power transmission and shifting operations are effected through wet clutches; that is, clutches that are in contact with or submerged in a body of lubricant. Wet clutches are also employed in many other transmission systems, such as modern farm tractors, earth moving machines, and the like. The plates of these clutches usually have either resin-impregnated paper-based linings or porous sintered metal linings such as sintered copper or sintered bronze.

One problem that frequently occurs with automatic transmissions and with wet clutch systems in general is that under certain conditions during clutch engagement a frictional phenomenon is encountered which is known as stick-slip and which is manifested in audible squawk and chatter. In addition to the fact that squawk and chatter are objectionable because of the attendant noise, they can also materially shorten the working life of clutch plates. Investigation has shown that the harmful stick-slip phenomenon is largely the result of large differences between dynamic friction and static friction, particularly at relatively low sliding speeds. It has been found that to avoid squawk and chatter, particularly in clutch systems that use sintered metal clutch faces, such as sintered bronze on steel, it is desirable to have a combination of a relatively high friction level at all sliding speeds with a minimum difference between static friction and sliding friction. While conventional friction modifiers such as fatty acids will reduce the difference between static and sliding friction, they, at the same time, lower the friction coefficient over the entire range of sliding velocities and thus do not satisfactorily solve the problem.

A hydrocarbon lubricant composition containing both a polyvalent metal soap and a polyvalent metal sulfonate will provide a satisfactory reduction in the difference between static friction and dynamic friction while at the same time retaining a high friction level at all sliding velocities. Thus, a composition of this type will satisfactorily solve the problem of squawk and chatter. However, when blends are prepared simply by mixing such a metal soap and the metal sulfonate with a hydrocarbon lubricating oil base stock, the mixture tends to be unstable, and haze and cloudiness develop, which are undesirable. This poor stability is believed to be a result of insufficient solubility of the metal soap in the composition.

It has now been found in accordance with the present invention that a clear, homogeneous mixture of metal soap and metal sulfonate can be prepared by reacting an overbased metal sulfonate can be prepared by reacting an overbased metal sulfonate with a fatty acid. Not only are the problems of haze, cloudiness, and instability overcome, but the resulting combination functions vary effectively in the presence of other additives that are required in multipurpose transmission fluids, such as viscosity index improvers, poor point depressants, rust inhibitors, antiwear agents, and emulsifiers.

To prepare the improved friction modifiers of the present invention, saturated or unsaturated fatty acids of from 12 to 22 carbon atoms are reacted with overbased sulfonates of polyvalent metals including those of lead, zinc, magnesium, aluminum, calcium, barium, and strontium. The alkaline earth metal salts are preferred and the calcium and barium salts are particularly preferred. The fatty acids that may be used include lauric, myristic, palmitic, stearic, eicosanoic, oleic, linoleic, and hypogaeic. Fatty acids of from 16 to 18 carbon atoms are preferred, and oleic acid and stearic acid are particularly preferred.

The fatty acids need not be pure but may be of commercial grades. Commercial oleic acid may range in purity from about 85 to 92 percent, for example. Mixed fatty acids may also be used such as those from linseed oil, soybean oil, tall oil, and the like.

Polyvalent metal salts of high molecular weight sulfonic acids obtained by sulfonating either natural hydrocarbons or synthetic hydrocarbons are well known to the art. The most commonly employed salts are the alkaline earth metal sulfonates. Suitable sulfonic acids for preparing sulfonates are obtained by treating lubricating oil base stocks with concentrated or fuming sulfuric acid to produce oil-soluble "mahogany" acids. Suitable sulfonic acids can also be produced by sulfonating alkylated aromatic hydrocarbons. Particularly useful are the products derived from the alkylation of aromatic hydrocarbons with olefins or olefin polymers, e.g. diisobutylene, tripropylene, etc.

The sulfonic acids can contain more than one sulfonic acid group in the molecule. The preferred sulfonic acids have molecular weights in the range of about 300 to about 1000 (as the sodium soap). The sulfonates that are employed in the present invention are the overbased or high alkalinity sulfonates which contain metal base in excess of that required for simple neutralization of the sulfonic acids to the normal metal sulfonates. A normal sulfonate of a mono-sulfonic acid and a divalent metal will contain one atom of metal for two sulfonic acid groups. In preparing the overbased sulfonates, the sulfonic acids are reacted with an excess of metal base and the excess metal base is then usually neutralized with an acidic gas, most usually carbon dioxide. A detailed description of the preparation of overbased sulfonates is not necessary here, since such preparations are well known to the art and the overbased sulfonates are readily available in commerce. Overbased sulfonates for use in the present invention are preferably those having a total base number (ASTM D664) of from about 50 to about 350. Specific examples of suitable sulfonates for use in this invention include: an overbased synthetic calcium sulfonate of 300 total base number derived from sulfonic acids of about 460 molecular weight; a barium salt of a petroleum sulfonic acid of 560 molecular weight overbased to 60 total base number; a calcium salt of sulfonated bottoms from a $C_{12}$ alkyl benzene ($C_{12}$ group from tetrapropylene) overbased to a total base number of 250; a zinc salt of a petroleum sulfonic acid of 450 molecular weight overbased to 200 base number; a barium $C_{16}$ alkyl benzene sulfonate ($C_{16}$ group from tetraisobutylene) overbased to a total base number of 290; and a lead salt of a petroleum sulfonic acid of 500 molecular weight overbased to 150 total base number.

The reaction of a fatty acid with an overbased polyvalent metal sulfonate to prepare the friction modifying additives of this invention may be conducted simply by mixing the two reactants together and heating to a temperature in the range of from about 100° to 350° F. until the reaction is completed as indicated by the cessation of foaming. Another check on whether the reaction is complete is to measure the acid number of the product. When no further change in acid number occurs, the reaction is complete. Excessive foaming can be controlled by use of silicone antifoaming additives. The preferred temperature range is about 150° to about 300° F., which permits completion of the reaction in about 1 to 2 hours. The proportion of fatty acid to overbased sulfonate will generally be in the range of from about 10 to about 150 wt. percent of fatty acid, based on the sulfonate. Preferably about 20 to about 100 wt. percent of the fatty acid is used, based on the sulfonate.

It is sometimes convenient to conduct the reaction in the presence of a mineral oil diluent which may be a mineral oil fraction such as a heavy naphtha, kerosene, gas oil, or the like. If a lubricating oil fraction is employed as the diluent, the reaction product can then be blended directly into the lubricating oil composition in which it is to be used. Thus for example a mineral oil diluent may be a light lubricating oil having a viscosity in the range of from about 80 to 250 SSU at 100° F. Generally the amount of mineral diluent will range from about 20 to about 80 wt. percent of the reaction mixture. After the reaction has been completed the product may be filtered if necessary and it will then be ready for further blending.

This invention may be better understood when reference is made to the following examples.

Example 1

A mixture was prepared by stirring together 180 grams of a synthetic calcium sulfonate concentrate and 20 grams of stearic acid. The mixture was heated with stirring, and foaming began when the temperature reached the range of 100° to 150° F. Stirring and heating were continued and the temperature was gradually raised to 250° F. The reaction was continued until foaming had ceased.

The reaction was repeated using a mixture of 45 grams of the synthetic calcium sulfonate concentrate, 5 grams of stearic acid and 50 grams of a mineral lubricating oil having a viscosity of 250 SUS at 100° F. The mixture was heated and stirred as in the first preparation, reaching a final temperature of 250° F. In this preparation foaming was not as strong as in the first preparation, indicating that foaming could be controlled by the use of the diluent mineral lubricating oil.

The high alkalinity calcium sulfonate used in these preparations was a commercial product known as Bryton C–300. It was a 50% concentrate in mineral lubricating oil of an overbased calcium sulfonate (from synthetic alkyl aromatics) of about 420 molecular weight containing 11.4% calcium and 16% carbonate as $CO_3$ and it had a total base number of 319 (i.e. an alkalinity equivalent to 319 mg. KOH/gram).

Example 2

A mixture was prepared, consisting of 1350 grams of the same synthetic calcium sulfonate concentrate that was used in Example 1, 150 grams of oleic acid, 750 grams of a refined solvent neutral mineral lubricating oil of 150 SSU viscosity at 100° F., and 750 grams of a solvent extracted naphthenic pale oil of about 48 SSU viscosity at 210° F. This mixture was heated, with stirring, to a final temperature of 300° F., the reaction being continued until all foaming had ceased.

Example 3

A transmission fluid was prepared by blending into a high viscosity index base stock formulated from a mixture of refined hydrocarbon lubricating oils and conventional viscosity index improvers, a total of about 1 wt. percent of conventional antioxidants and rust preventives, along with about 3 wt. percent of a dispersant additive consisting of a 60 wt. percent concentrate, in oil, of the tetraethylenepentamine imide derivative of polybutenylsuccinic anhydride wherein the polybutenyl group had a molecular weight of about 900.

To one portion of this fluid was added 0.5 wt. percent of the reaction product of 100 parts of the synthetic calcium sulfonate concentrate described in Example 1 and 50 parts of oleic acid. To another portion of the fluid was added 0.2 wt. percent of unreacted oleic acid. Both of these blends were then tested in a 1964 Chevrolet Powerglide transmission. Squawking of the transmission occurred when the blend containing free oleic acid was tested, whereas when the blend was used containing the sulfonate-oleic acid reaction product no squawking was encountered.

Example 4

A barium salt of a petroleum sulfonic acid of 610 molecular weight overbased to a total base number of 85 is reacted with 25 wt. percent of linseed oil fatty acids for 1½ hours at 250° F. One wt. percent of the product is blended into an automatic transmission fluid to serve as a friction modifier.

Example 5

An automatic transmission fluid suitable for use in passenger cars or as a multi-purpose tractor fluid, i.e. one that can be employed for the hydraulic system of the tractor as well as for the transmission, was prepared by simple mixing of a base stock, a viscosity index improver, a pour point depressant, an antiwear agent, an antioxidant and an extreme pressure agent and emulsifying agents as well as the friction modifier prepared as described in Example 2. Related formulations were prepared in which no friction modifier was used and which, instead of the friction modifier of Example 2, contained unmodified overbased calcium sulfonate.

Each of these formulations was tested for differences in static and dynamic friction using the General Motors low velocity friction apparatus described by Merrill L. Haviland and John J. Rodgers in a paper entitled "Friction Characteristics of Automatic Transmission Fluids as Related to Transmission Operation" presented at the 15th annual meeting of the American Society of Lubricating Engineers in Cincinnati, Ohio, in April 1960 (Preprint No. 60AM 6A-1). The test conditions included an operating temperature of 100° F. and a load of 100 lbs. Friction coefficients were determined at zero velocity and at 20 ft. per minute. The compositions of the formulations are given in Table I and the results obtained are given in Table II.

TABLE I

|  | Composition | | |
| --- | --- | --- | --- |
|  | A | B | C |
|  | Parts by Weight | | |
| Base Oil [1] | 100 | 88.6 | 88.6 |
| Overbased Ca Sulfonate |  | 4.0 |  |
| Product of Example 2 |  |  | 4.0 |
| Antiwear Agent [2] |  | 0.4 | 0.4 |
| V.I. Improver [3] |  | 4.0 | 4.0 |
| Pour Point Depressant [4] |  | 0.3 | 0.3 |
| Antioxidant [5] |  | 0.5 | 0.5 |
| Emulsifier [6] |  | 1.2 | 1.2 |
| E P Agent [7] |  | 1.0 | 1.0 |

[1] Mixture of 50 wt. percent low pour point acid treated coastal distillate (40 SUS visc. at 210° F.), 35 wt. percent solvent neutral phenol extracted paraffin distillate 150 SUS at 100° F. and 15 wt. percent solvent neutral extracted paraffin distillate of 325 SUS at 100° F.
[2] Zinc salts of mixed $C_4$-$C_5$ dialkyl dithiophosphoric acids.
[3] Polyisobutylene of about 100,000 molecular weight dissolved in mineral oil (30 wt. percent of polymer in oil).
[4] Wax alkylated naphthalene.
[5] 2,6-di-tert. butyl-4-methyl phenol.
[6] Equal mixture of ethoxylated tridecyl alcohol and ethoxylated octyl phenol.
[7] Chlorinated biphenyl (48% Cl).

TABLE II.—RESULTS OF LOW VELOCITY FRICTION APPARATUS TEST

| Composition | Friction Coefficient | | Percent Difference |
| --- | --- | --- | --- |
|  | Static | Dynamic |  |
| A | 0.15 | 0.10 | 50 |
| B | 0.15 | 0.11 | 36 |
| C | 0.12 | 0.10 | 20 |

It will be noted from the data in Table II that the sulfonate alone reduced the percent difference between static friction and dynamic friction to 36% as compared with 50% for the unmodified oil whereas the reaction product of the overbased sulfonate and oleic acid reduced the percent difference to 20%.

Formulations B and C of Table I were also tested in the clutch of an International Harvester Corporation tractor. The clutch had sintered-bronze-on-steel clutch plates. In this test, in which the initial relative speed of the plates before engagement was about 500 r.p.m. and application pressures were varied to produce torque loads in the range of 300 to 500 foot pounds, formulation B produced squawk and chatter whereas formulation C did not.

An attempt was made to prepare a formulation similar to formulation C of Table I using in place of the reaction product of the overbased calcium sulfonate and oleic acid a mixture of a normal calcium sulfonate and calcium oleate in the proportions of 9 parts of sulfonate to 1 part of calcium oleate. The blend thus obtained was hazy and unstable in that the calcium oleate tended to come out of solution.

The friction modifiers of the present invention may be incorporated in transmission fluids in concentrations ranging from about 0.2 to about 5 wt. percent and preferably in the range of about 0.5 to about 3% by weight, the percentages being on an active ingredient basis. Thus, for example, to provide 2 wt. percent of actual ingredient, 4 wt. percent of a 50% concentrate would be used.

In the preparation of hydraulic fluids and particularly automatic transmission fluids utilizing the friction modifiers of the present invention the selection of the base stock will depend somewhat on the performance demanded of the completely formulated fluid. For example, to meet the proper requirements of limited swelling of rubber seals it is conventional to use a mixture of paraffinic and naphthenic stocks. Thus, mixtures of a low pour point, acid-treated or hydrofined coastal distillate of 35–50 seconds Saybolt viscosity at 210° F. and 65 viscosity index and of phenol extracted paraffinic distillate of 100 to 170 Saybolt seconds viscosity at 100° F. and 100 V.I. may be used. Sufficient viscosity index improver may then be added to this mixture to provide the desired viscosity and viscosity index. In general, automatic transmission fluids have a viscosity in the range of from about 34 to about 60 Saybolt seconds at 210° F., a viscosity index of at least 90, a pour point at least as low as −20° F., preferably −35° F., and a flash point no lower than about 300° F. For some uses, as for example, to meet the viscosity limitations of a General Motors Type A Suffix A automatic transmission fluid a minimum viscosity of 49 Saybolt seconds at 210° F. is required.

The viscosity index improvers may be any of the conventional types known to the art, including olefin polymers such as polyisobutylene, carboxylic ester polymers such as polymethyl methacrylate, polyoctyl acrylate, copolymers of unsaturated dicarboxylic acid esters with other monomers, e.g. a copolymer of mixed $C_8$–$C_{18}$ alkyl fumarates with vinyl acetate and maleic anhydride, and the like.

The compositions may also contain one or more detergent inhibitors such as phosphosulfurized hydrocarbons, e.g. $P_2S_5$-treated terpenes, $P_2S_5$-treated polyisobutylene, alkaline earth metal phenate thioethers, e.g. barium tert. octyl phenol sulfide, imides of alkenyl succinic anhydrides and polyalkylene polyamines, and the like. Conventional antioxidants such as phenyl alpha naphthylamine, 2,6-di tert. butyl para cresol, antirust agents, extreme pressure agents, etc. may also be included in the formulations.

It is to be understood that the examples presented in the foregoing specification are merely illustrative of the invention and that the invention is not to be limited thereto. The scope of the invention is to be determined by the appended claims.

What is claimed is:

1. A hydraulic fluid suitable for use in systems employing wet clutches which consists essentially of a major proportion of a hydrocarbon lubricating oil to which has been added from about 0.2 to about 5 wt. percent of the product obtained by heating an overbased polyvalent metal hydrocarbon sulfonate having a total base number in the range of from about 50 to about 350 with from about 10 to about 150 wt. percent of a $C_{12}$ to $C_{22}$ fatty acid, based on the weight of said sulfonate, at a temperature in the range of 100 to 350° F. until no further change in acid number occurs, said polyvalent metal being selected from the group consisting of lead, magnesium, zinc, aluminum, calcium, barium, and strontium, said reaction product being effective to reduce the stick-slip phenomenon associated with said wet clutches.

2. Composition as defined by claim 1 wherein said overbased sulfonate is an alkaline earth metal sulfonate.

3. Composition as defined by claim 1 wherein said reaction product is the reaction product of an overbased calcium hydrocarbon sulfonate and oleic acid.

4. An improved friction modifier for addition to a hydrocarbon based hydraulic fluid which consists essentially of the product obtained by reacting, at a temperature in the range of from 100 to 350° F. and until no further change in acid number occurs, an overbased polyvalent metal hydrocarbon sulfonate having a total base number in the range of from about 50 to 350 with from 10 to 150 wt. percent of a $C_{12}$ to $C_{22}$ fatty acid, based on the weight of said sulfonate, said polyvalent metal being selected from the group consisting of lead, magnesium, zinc, aluminum, calcium, barium, and strontium.

5. Improved friction modifier as defined by claim 4 which is in the form of a concentrate containing in the range of from about 20 to about 80 wt. percent of said reaction product in a mineral lubricating oil.

6. Improved friction modifier as defined by claim 4 wherein the product is obtained by reacting an overbased alkaline earth metal hydrocarbon sulfonate with oleic acid.

7. Improved friction modifier as defined by claim 4 wherein the product is obtained by reacting an overbased alkaline earth metal hydrocarbon sulfonate with stearic acid.

References Cited

UNITED STATES PATENTS

| | | | |
|---|---|---|---|
| 3,203,896 | 8/1965 | Latos, et al. | 252—75 XR |
| 3,242,079 | 3/1966 | McMillen | 252—33 |

LEON D. ROSDOL, *Primary Examiner.*

S. D. SCHWARTZ, *Assistant Examiner.*